(12) United States Patent
Kim (10) Patent No.: US 9,244,512 B2
(45) Date of Patent: Jan. 26, 2016

(54) POWER SUPPLY DEVICE HAVING A STANDBY POWER CUTOFF STRUCTURE

(76) Inventor: Chang-Ho Kim, Seoul (KR)

(*) Notice: Subject to any disclaimer, the term of this patent is extended or adjusted under 35 U.S.C. 154(b) by 661 days.

(21) Appl. No.: 13/637,786

(22) PCT Filed: Mar. 17, 2011

(86) PCT No.: PCT/KR2011/001869
§ 371 (c)(1),
(2), (4) Date: Sep. 27, 2012

(87) PCT Pub. No.: WO2011/122777
PCT Pub. Date: Oct. 6, 2011

(65) Prior Publication Data
US 2013/0020995 A1    Jan. 24, 2013

(30) Foreign Application Priority Data

Mar. 31, 2010 (KR) .................. 10-2010-0029047
Jun. 16, 2010 (KR) .................. 10-2010-0057223

(51) Int. Cl.
*G06F 1/32* (2006.01)
*H01R 13/703* (2006.01)
*H02J 9/00* (2006.01)

(52) U.S. Cl.
CPC .............. *G06F 1/32* (2013.01); *H01R 13/7036* (2013.01); *H02J 9/005* (2013.01)

(58) Field of Classification Search
CPC ......... G06F 1/32; H01R 13/7036; H02J 9/005
USPC ....................................................... 307/131
See application file for complete search history.

(56) References Cited

U.S. PATENT DOCUMENTS

| 6,392,903 | B2* | 5/2002 | Mori et al. ................. 363/21.07 |
| 8,432,067 | B2* | 4/2013 | Eikum .......................... 307/119 |
| 2001/0014027 | A1 | 8/2001 | Mori et al. |
| 2010/0051427 | A1 | 3/2010 | Eikum |
| 2011/0304301 | A1 | 12/2011 | Kim |

FOREIGN PATENT DOCUMENTS

| CN | 102349211 A | 2/2012 |
| GB | 2443455 A | 5/2008 |
| JP | 6-292363 A | 10/1994 |
| JP | 2000-102184 A | 4/2000 |
| JP | 2000-152499 A | 5/2000 |

(Continued)

*Primary Examiner* — Hal Kaplan
(74) *Attorney, Agent, or Firm* — Jefferson IP Law, LLP (57) ABSTRACT

A power supply device having a standby power cutoff structure, comprises: a power supply unit which has a plug connected to a socket, converts an external power for a power supply target device, and generates self-operating power; a connector unit which includes a power supply terminal to supply power to the power supply target device, and opens or blocks a power supply path between the external power and the power supply unit in response to a switching driving signal received from the power supply unit; and a cable for connecting the power supply unit and the connector unit, wherein the power supply unit checks the state of power supplied through a switching unit to output the switching driving signal to the switching unit such that the switching unit cuts off a power supply when the power supply target device is fully charged or the power supply device is turned off.

15 Claims, 7 Drawing Sheets

(56) References Cited

FOREIGN PATENT DOCUMENTS

| | | |
|---|---|---|
| JP | 2000-166090 A | 6/2000 |
| JP | 2001-229773 A | 8/2001 |
| JP | 2003-284342 A | 10/2003 |
| KR | 10-2002-0057500 A | 7/2002 |
| KR | 10-2007-0091502 A | 9/2007 |
| KR | 10-2009-0099397 A | 9/2009 |
| KR | 10-2009-0129967 A | 12/2009 |

* cited by examiner

POWER SUPPLY DEVICE HAVING A STANDBY POWER CUTOFF STRUCTURE

CROSS REFERENCE TO RELATED APPLICATIONS

This application is a National Stage application under 35 U.S.C. §371 of an International application filed on Mar. 17, 2011 and assigned application No. PCT/KR2011/001869, and claims the benefit under 35 U.S.C. §365(b) of a Korean patent application filed Mar. 31, 2010 in the Korean Intellectual Property Office and assigned application No. 10-2010-0029047, and a Korean patent application filed Jun. 16, 2010 in the Korean Intellectual Property Office and assigned application No. 10-2010-0057223, the entire disclosure of each of which is hereby incorporated by reference.

TECHNICAL FIELD

The present invention relates to a power supply apparatus for supplying power to various electronic products requiring DC power, such as a conventional notebook, netbook, radio, CD player and the like, and more particularly to a technology which has a function of cutting off standby power when a power supply of a product is turned "off" and automatically cuts off the standby power when the power supply of the product is turned "off".

BACKGROUND ART

In general, a power supply apparatus for supplying power to a product (notebook, netbook or the like) having a self charging battery or a product (radio, CD player or the like) having no charging battery includes a connector connected to the corresponding product, a plug connected to commercial AC power and the like, and has a structure of converting the commercial AC power to DC power suitable for the corresponding product and providing the converted DC power to the product through the connector.

However, the power supply apparatus has a problem in that power is wasted since standby power is continuously generated even in a state where a power supply of the product is turned "off" or a battery is fully charged.

Due to the above problem, a program for legally regulating standby power is recently prepared all over the world including Korea. The standby power of the power supply apparatus has been restricted to 1 W from 2010 in Korea, and the standby power was restricted to 1 W or less in 2010 and a bill of restricting the standby power to 0.5 W has been passed and is due to take effect in Europe in 2013.

Accordingly, it is greatly required to provide a method of minimally maintaining or cutting off the standby power in the power supply apparatus.

DETAILED DESCRIPTION OF THE INVENTION

Technical Problem

The present invention has been made to solve the above mentioned problems occurring in the prior art and provides a power supply apparatus capable of completely cutting off standby power without unplugging an electronic product when a battery of the electronic product is fully charged and when a power supply of the electronic product is turned "off".

The present invention provides a power supply apparatus capable of completely cutting off standby power of an electronic product in an off state and automatically switching the electronic product to an on state when a power supply of the electronic product is turned on if the corresponding electronic product is required to be in the on state.

Technical Solution

In accordance with an aspect of the present invention, there is provided a power supply apparatus with a standby power cut-off structure, the power supply apparatus including: a power supply unit for receiving external power supplied through a plug to convert the external power to power suitable for a power supply target apparatus and generating its own operation power of the power supply apparatus, the power supply unit including the plug connected to an outlet to receive the external power; a connector unit including a power supply terminal connected to a connection terminal of the power supply target apparatus to supply power to the power supply target apparatus, and a switching unit for establishing or blocking an electric conduction of a power supply path through which the external power is provided to the power supply unit by a drive of a solenoid according to a switching driving signal provided from the power supply unit and a mechanical movement according to the drive of the solenoid, the switching unit being installed in the corresponding power supply path between the external power and the power supply unit; and a cable for connecting the power supply unit and the connector unit, wherein the power supply unit identifies a supply state of power provided through the switching unit, outputs the switching driving signal to the switching unit when it is determined, through the identified supply state, that a battery of the currently connected power supply target apparatus is fully charged and/or a power supply is turned off, and allows the switching unit to cut off the power supply.

Advantageous Effects

As described above, the present invention cuts off input power to a corresponding product to make standby power zero when a power supply of a notebook or a netbook is turned "off" or when a battery is fully charged and also turns "off" a power supply of electronic products (radio, CD player and the like) to make the standby power zero, so that unnecessary power consumption can be prevented. Further, a power supply apparatus according to the present invention is automatically switched to an on state when the electronic product is required to be in the on state.

MODE FOR CARRYING OUT THE INVENTION

In the following description, a detailed explanation of known related functions and constitutions may be omitted to avoid unnecessarily obscuring the subject matter of the present invention. Further, terms which will be described below are defined considering functions according to the present invention, and may vary depending on an intention of the user and operator or a convention. Therefore, the definition should be made based on the contents throughout the specification.

The present invention proposes a power supply apparatus having a function of completely cutting off standby power when a power supply of an electronic product (notebook, netbook and the like) using a charging battery is turned "off" and a battery is fully charged or when a power supply of an electronic product (radio, CD player and the like) using no charging battery is turned "off" and a power plug is plugged into an outlet.

Figure 1A:
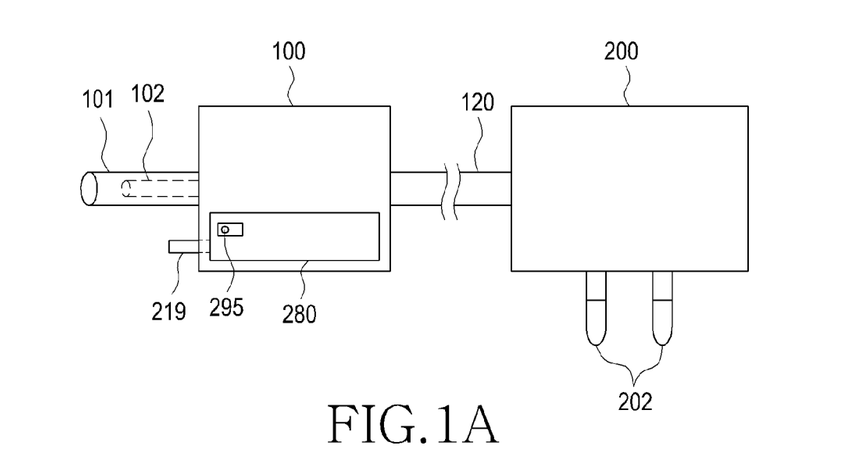
FIG. 1 is a schematic external structure diagram of a power supply apparatus with a standby power cut-off structure according to an embodiment of the present invention.
Figure 1B:
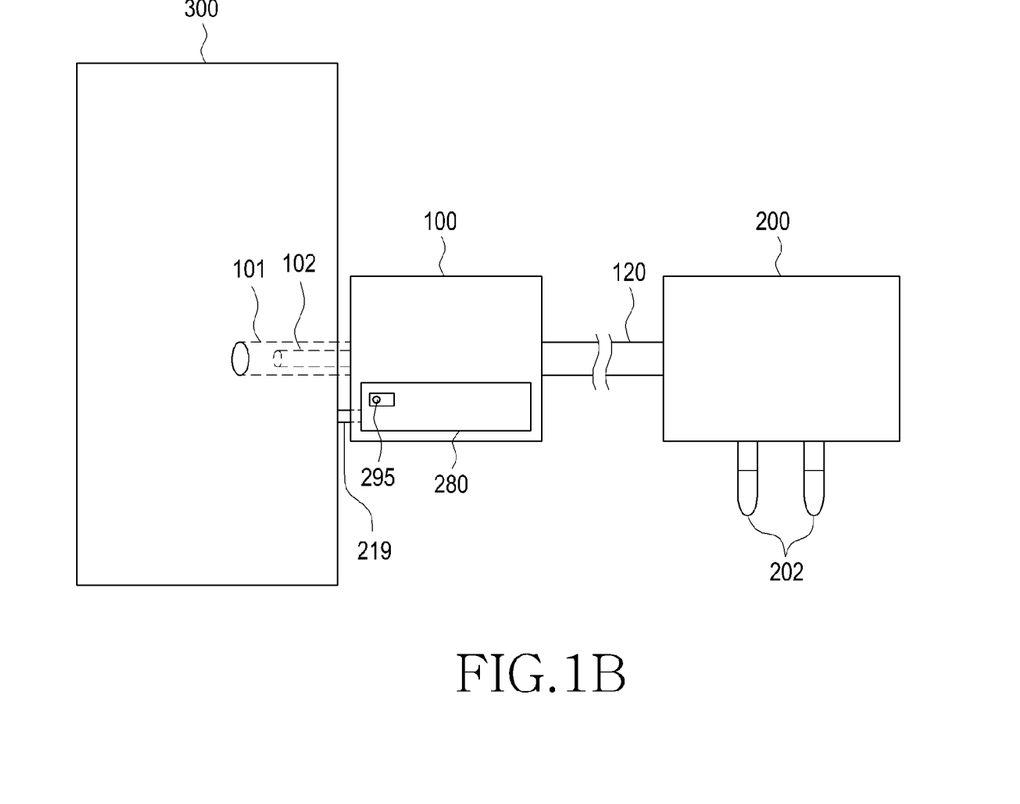

FIG. 1 is a schematic external structure diagram of a power supply apparatus with a standby power cut-off structure according to an embodiment of the present invention, FIG. 1A illustrates a structure of the power supply apparatus in a state where the power supply apparatus is not connected to a product, and FIG. 1B illustrates a structure of the power supply apparatus in a state where the power supply apparatus is connected to a product 300 (notebook, netbook, radio or the like). Referring to FIG. 1, the power supply apparatus according to the present invention has a plug configured to be insertable in an outlet to receive commercial AC power, and includes a power supply unit 200 for converting the commercial AC power to DC power suitable for the product 300 and generating its operation power, a connector unit 100 connected to the product 300, and a cable 120 for connecting the power supply unit 200 and the connector unit 100.

At this time, the connector unit 100 includes +/− power supply terminals 101 and 102 configured to be inserted in a connection terminal of the product 300, and a switching unit 280 installed in a power supply path between the commercial AC power and the power supply unit 200 and configured to establish or block an electric conduction of the corresponding power supply path by a drive of a solenoid according to a switching control signal provided from the power supply unit 200 and a mechanical movement of a contact according to the drive of the solenoid.

When the switching unit 280 includes a knob 219 installed in a contact surface between the product 300 and the switching unit 280 when the connector unit 100 is connected to the product 300 and configured to be pressed. The knob 219 is configured to return to an original state by a knob spring 281 described below in a state where the connector unit 100 is not connected to the product. A contact of the switching unit 280 is mechanically configured to additionally move to a position for establishing an electric conduction of the power supply path by an initial press of the knob 219. Further, the switching unit 280 may include a manual control switch 295 configured to manually turn "on" or "off" a power supply which will be described below. Similarly, the manual control switch 295 is configured to achieve the mechanical movement of the contact of the switching unit 280. At this time, when the knob 219 is initially pressed, the manual control switch 295 is mechanically configured to move to a position in an on-state through an interworking, and it may be mechanically configured that a position movement according to an off-state and the on-state does not influence the movement of the knob 219 since a subject of the position movement is the manual control switch 295.

The power supply unit 200 identifies a supply state of power provided via the switching unit 280. When it is determined through the supply state that the currently connected product is in a state where a battery is fully charged or a power supply is turned off, the power supply unit 200 outputs a switching control signal to the switching unit 280 and allows the switching unit 280 to cut off the power supply. Further, the power supply unit 200 identifies whether operation power is provided from the corresponding connected product through the power supply terminal of the connector unit 100. When the operation power is provided, the power supply unit 200 outputs the switching control signal to the switching unit 280 and allows the switching unit 280 to restart the power supply.

Hereinafter, configurations and operations of the connector unit 100 and the power supply unit 200 will be described in more detail with reference to the accompanying drawings. First, a mechanical structure of and the switching unit 280 installed in the connector unit 100 and an operation according to the mechanical structure will be described in more detail with reference to FIGS. 3 to 7.

Figure 3:
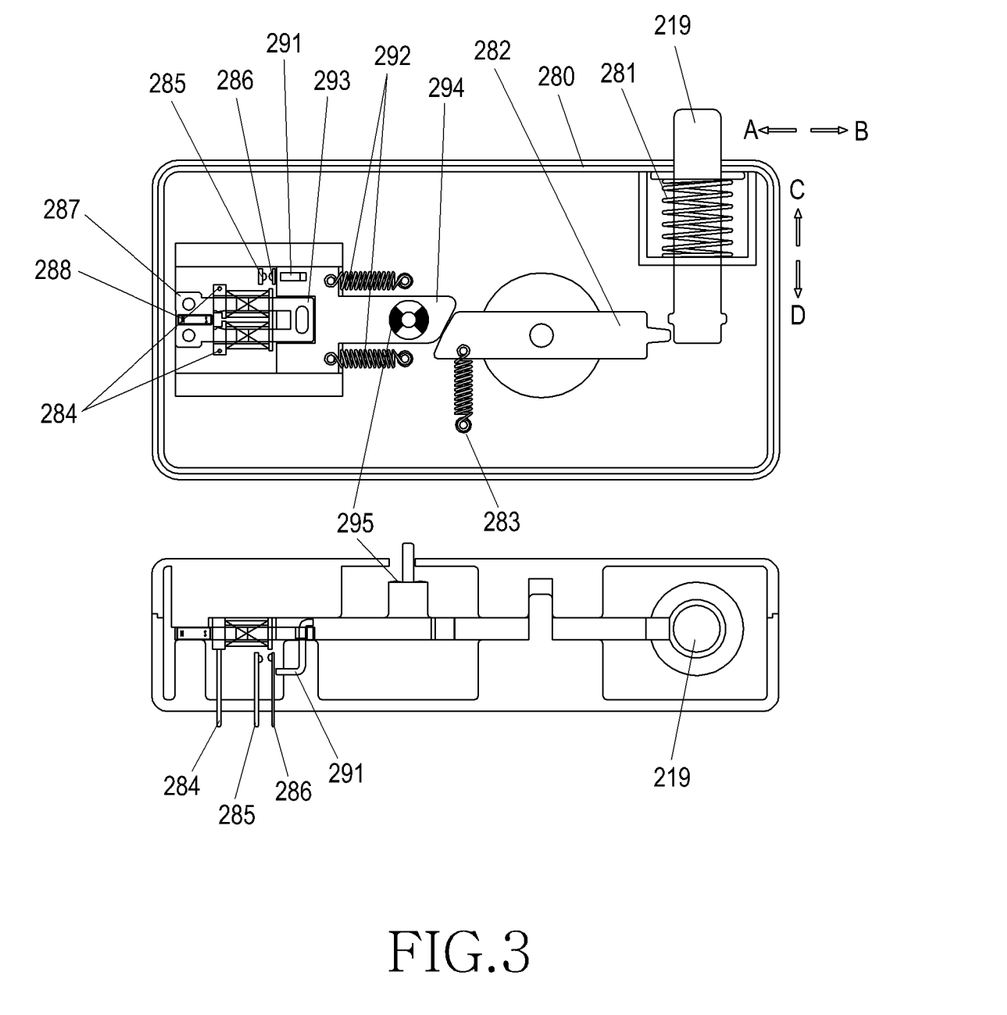
FIGS. 3 to 7 are detailed plane views and side views of an example of a switching unit in FIG. 1 or FIG. 2.
Figure 4:
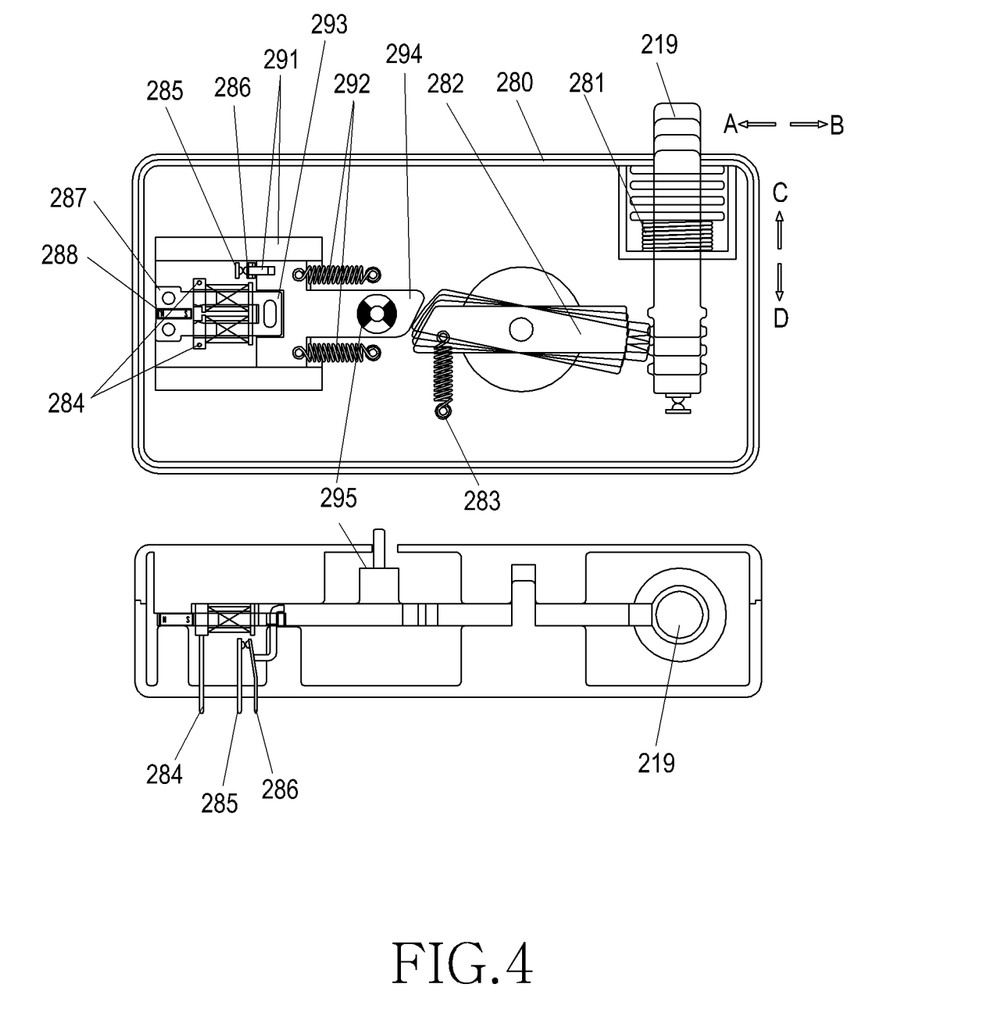
Figure 5:
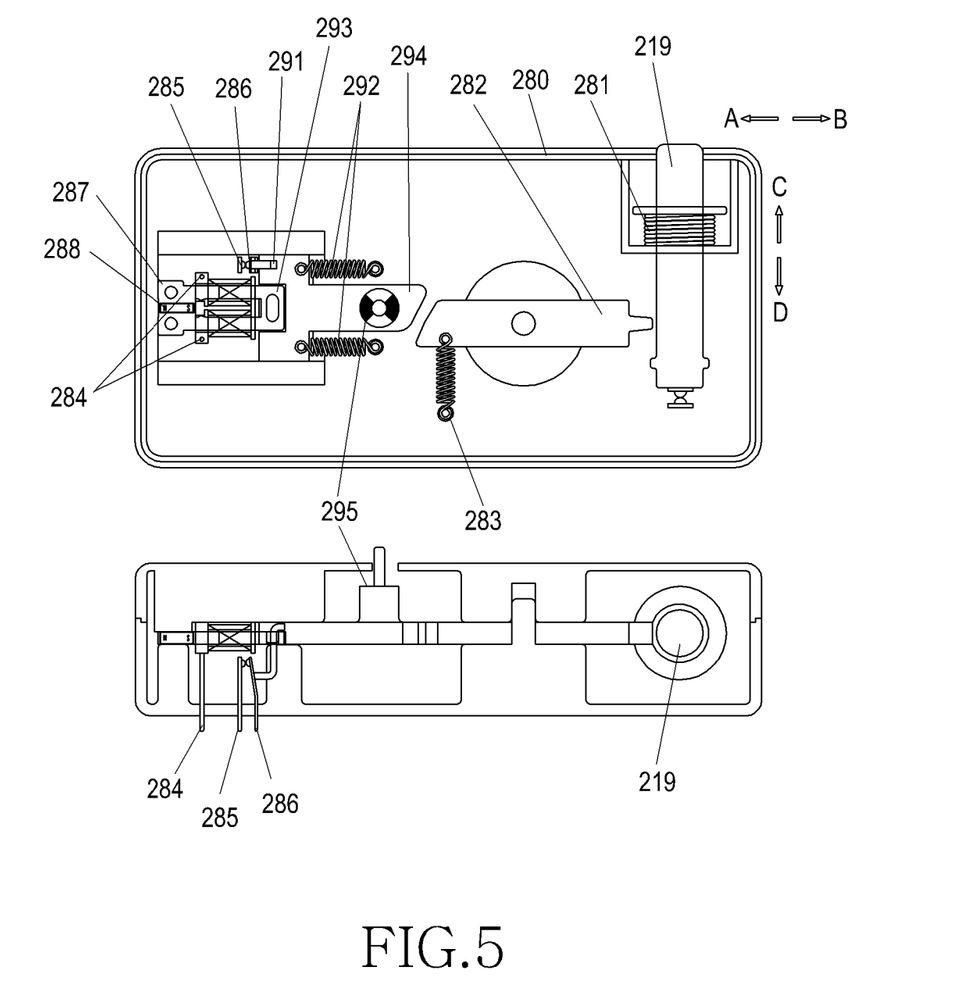
Figure 6:
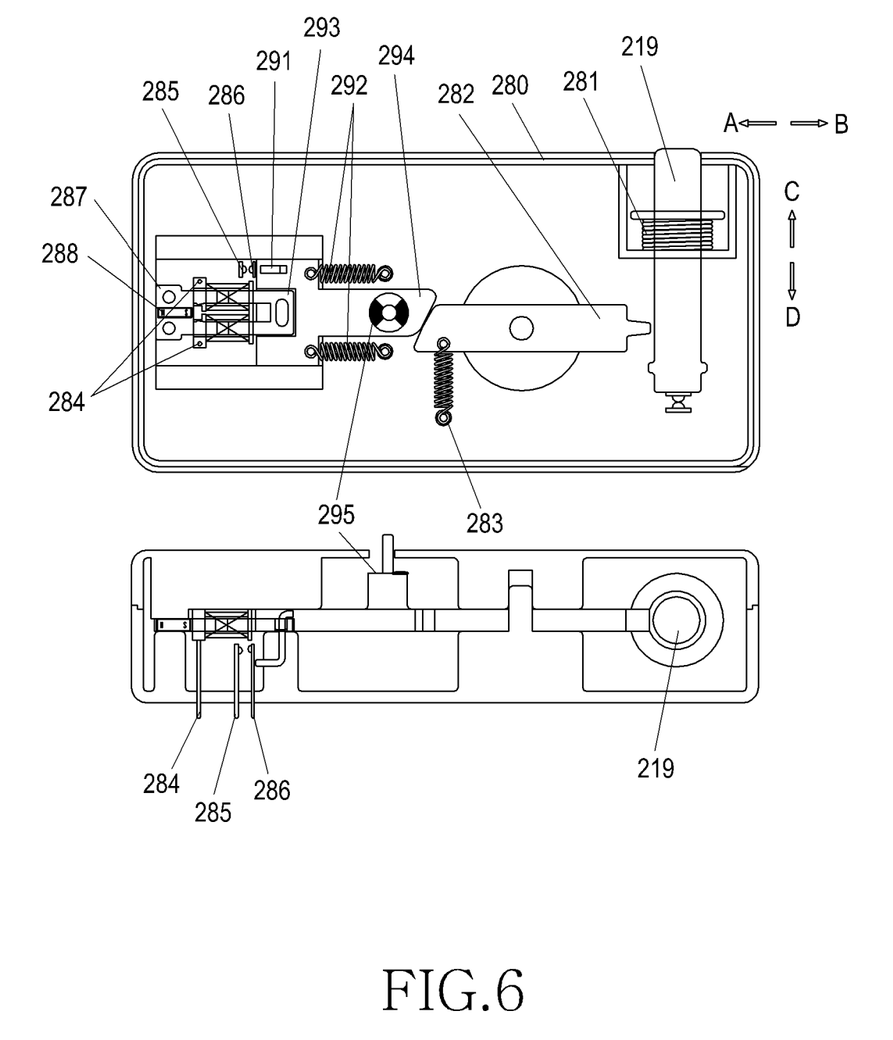
Figure 7:
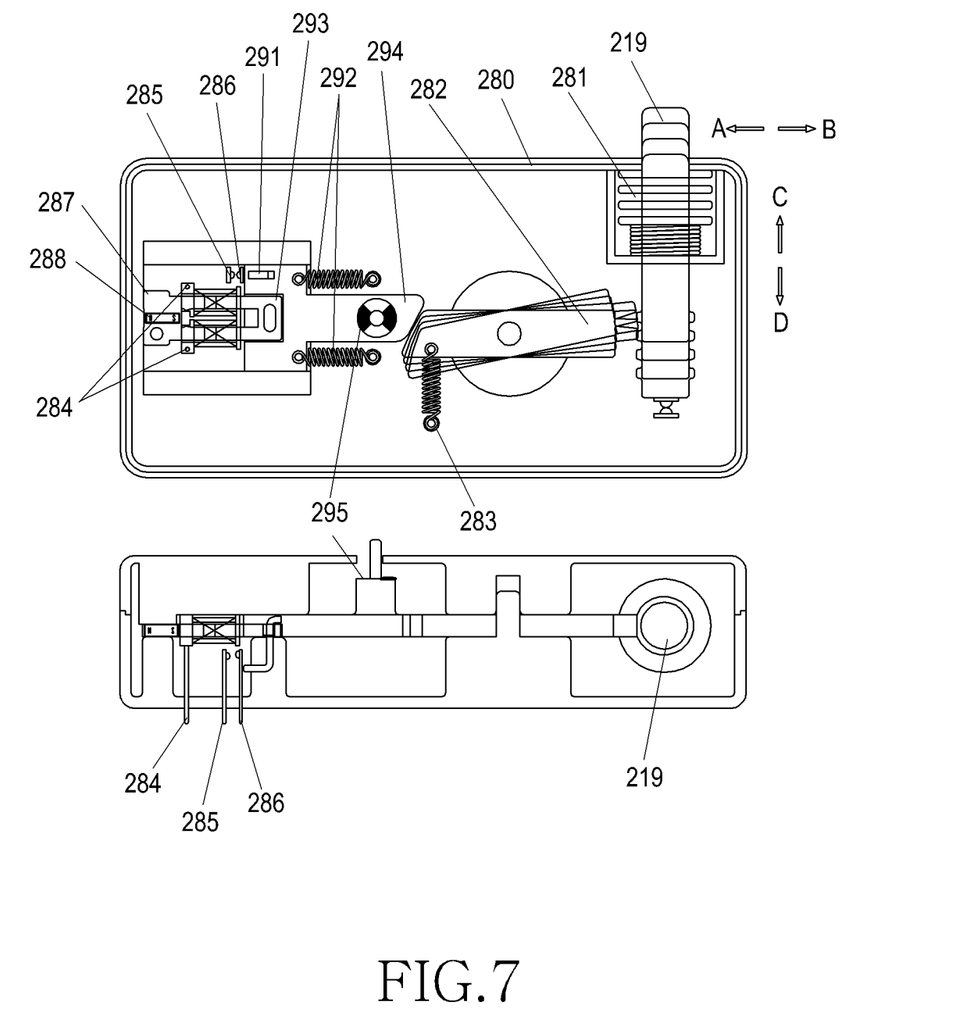

FIGS. 3 to 7 are detailed plane structure views and side structure views of an example of the switching unit in FIG. 1 or FIG. 2, FIG. 3 illustrates a state of the switching unit 280 when the initial connector unit 100 is not connected to the product 300, FIG. 4 illustrates a state of the switching unit 280 while the connector unit 100 is connected to the product 300, that is, the knob 219 is initially pressed, FIG. 5 illustrates a state where the knob 219 is completely pressed, FIG. 6 illustrates a state of the switching unit 280 by a power cut-off operation or a manual off control, and FIG. 7 illustrates a state of the switching unit 280 while the connector unit 100 is separated from the product 300.

Referring to FIG. 1 and FIGS. 3 to 7, the switching unit 280 includes the knob 219 located in a predetermined position in the connector 100 and pressed in a D direction to supply main power to the power supply unit 200 when the connector unit 100 is inserted in the product 300, and the knob spring 281 for returning the knob 219 to an original position when the knob 219 is released in a C direction.

Further, the switching unit 280 includes a cam lever 282 for pushing a cam 294 so that the cam 294 moves in an A direction according to a press of the knob 219, and a lever spring 283 for returning the cam lever 282 to an original position after the cam lever 282 pushes the cam 294.

Meanwhile, when the cam lever 282 hits the cam 294, the cam 294 moves in the A direction and a slide 293 of a metal material integrally formed with the cam 294 is drawn and attached to a core 287 by force of a magnet 288 integrally formed with the core 287, so that the cam 294 finally remains in the position moved in the A direction. At this time, a camp spring 292 for returning the cam 294 to an initial position in a B direction is installed in the cam 294. When the cam 294 is attached to the core 287 by magnetic force of the magnet 288, a state where the cam spring 292 is attached to the core 287 is maintained by configuring an intensity of the corresponding magnetic force to be stronger than that of restitutive force by the cam spring 292.

Further, a striker 291 made of an insulation material integrally formed with the cam 294 is provided and the striker 291 presses an elastic contact 286 when the cam 294 moves in the A direction, so that the elastic contact 286 is connected with a fixed contact 285. Through the connection between the elastic and fixed contacts 285 and 285, the power supplied through the switching unit 280 is provided and blocked.

Moreover, when a current flows to the solenoid 284 in one direction to open the contact in a state where the fixed contact 285 and the elastic contact 286 are connected, repulsive force with the magnet 288 is generated and the cam spring 292 returns in the B direction, thereby the contacts are separated from each other.

Describing an operation of the switching unit 280 having such a configuration, when the connector unit 100 is connected to the electronic product such as a notebook, a netbook or the like, the knob 219 enters in the D direction and the cam lever 282 upwardly pushes the cam 294 as illustrated in FIG. 4, so that the slide 293 made of a metal conductor integrally formed with the cam 294 is taken by attractive force of the magnet 288 integrally formed with the core 287. Accordingly, the striker 291 made of an insulation material integrally formed with the cam 294 moves in the A direction, and thus the fixed contact 285 and the elastic contact 286 are connected, thereby supplying power. Further, when the knob 219 pushes the cam lever 282 and moves downwardly, the lever 282 returns to an original position by the lever spring 283, and the state illustrated in FIG. 5 is maintained.

In such a state, as illustrated in FIG. 6, a micom (micom u2 of FIG. 2 described below) determines, through a current flowing in the power supply path, whether a power supply of the product such as the corresponding notebook, netbook or the like is turned off and a battery is being charged. When the battery is fully charged and a supply current is equal to or smaller than a reference current i1, the micom applies a voltage to one direction of the solenoid coil 284, and repulsive force is generated. Then, the slide 293 pulls the cam 294 in the B direction by the cam spring 292, and thus the striker 291 returns to an original position and the fixed contact 285 and the elastic contact 286 are separated from each other, so that input power is cut off and standby power is interrupted.

At this time, the manual control switch 295 in a cam knob type integrally formed with the cam 294 so as to turn on the power supply moves in the B direction, and the user can discriminate a current on/off state with his/her eyes through the movement.

When the power supply is desired to be turned on in a state where the connector unit 100 is inserted in the electronic product such as the notebook, the netbook or the like, if the manual control switch 295 is pushed in the A direction, the fixed contact 285 and the elastic contact 286 are connected to each other and make the state illustrated in FIG. 5, similarly as supplying power by pressing the knob 219. As described above, it is possible to manually supply power through the manual control switch 295.

Meanwhile, as illustrated in FIG. 7, when the connector unit 100 is extracted from the connection terminal of the electronic product such as the notebook, the netbook or the like, the knob 219 returns to an original position as the knob spring 281 moves in the C direction. At this time, the cam lever 282 moves in the C direction as opposed to a case where the knob 219 is pressed in the D direction, and makes the state illustrated in FIG. 3 without touching the cam 294.

At this time, since the supply current becomes equal to or smaller than the reference current i1 when the product is separated, the micom applies the voltage to one direction of the solenoid coil 284 and thus the repulsive force with the magnet 288 is generated so that the slide 293 pulls the cam 294 in the B direction by the cam spring 292, and the striker returns to the original position and thus the fixed contact 285 and the elastic contact 286 are separated from each other. As a result, the input power is cut off and then the standby power is interrupted.

Figure 2:
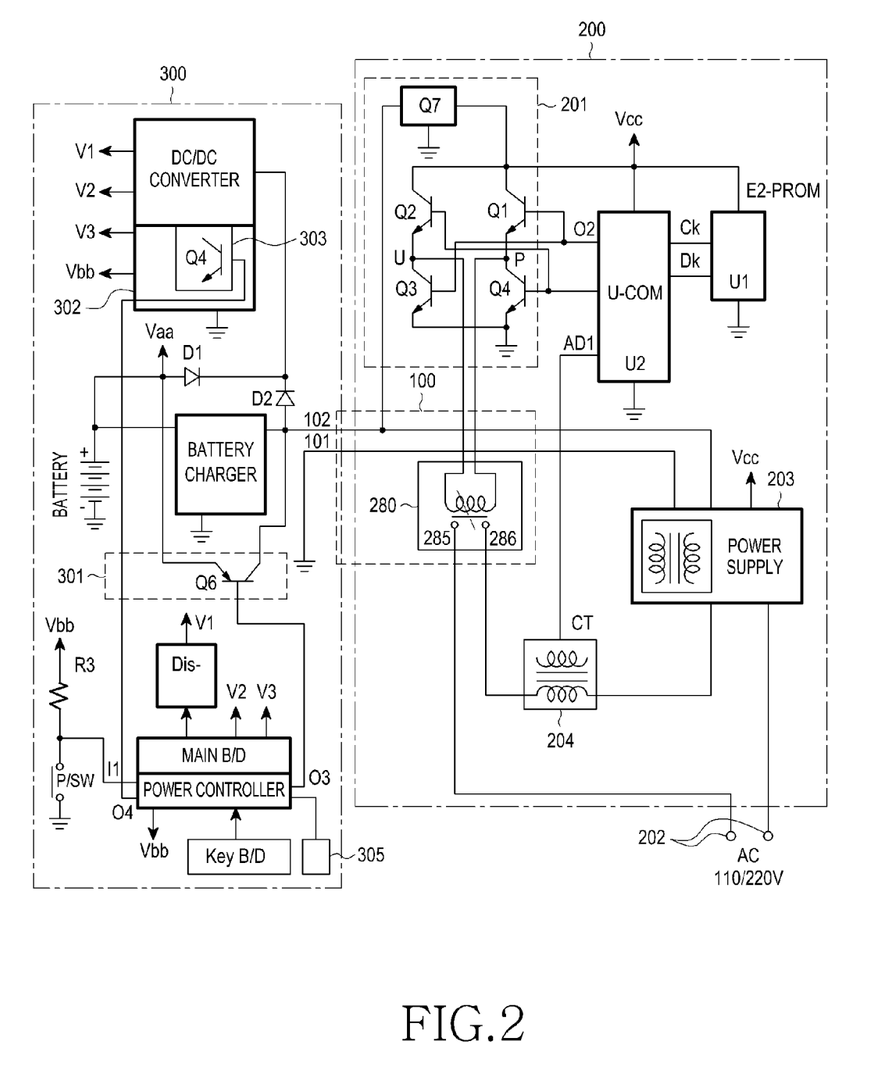
FIG. 2 is an internal circuit block diagram of a power supply apparatus with a standby power cut-off structure and a related product according to an embodiment of the present invention.

FIG. 2 is an internal circuit block diagram of the power supply apparatus with the standby power cut-off structure and a related product according to an embodiment of the present invention, and illustrates, for example, a structure of the power supply unit 200 connected to the product 300 having a battery. First describing an internal configuration of the product 300 with reference to FIG. 2, the product 300 such as the notebook, the netbook or the like, for example, includes a main board (main B/D) for processing and controlling information, a key board (key B/D) for inputting data, a display unit for a screen display, a battery used as a power source when carrying the product, a battery charger for controlling charging of the battery, a DC/DC converter for converting DC power supplied from the power supply apparatus or battery power to power required by the corresponding product, a power switch (P/SW) for turning "on" or "off" a power supply, a power controller for controlling power according to an "on" or "off" state of the power switch, a standby power unit 302 for supplying power to control the power when the power supply is turned "off", the standby power unit 302 and a switcher 303 therein for supplying power to the DC/DC converter when a power "on" signal is detected, and a Wake-on-LAN 305 for driving the product 300 through an Internet from the outside in a state where the power supply is turned "off".

In such a configuration, particularly according to characteristics of the present invention, the product 300 may further include a switching unit driving switcher 301 for supplying power in order to allow the power supply apparatus to operate when the power supply is turned "on" in a state where the power from the power supply apparatus is cut off. The switcher 301 may be configured by a switching transistor Q6 for providing battery power to the power supply terminal of the connector unit of the power supply apparatus under a control of the power controller.

Meanwhile, when the corresponding product, for example, a radio or a CD player does not have a charging battery, a configuration in which power is supplied to the power supply apparatus from the corresponding product is not provided, so that an existing product can be directly used.

Describing the configuration of the power supply apparatus with reference to FIG. 2, the power supply apparatus may include the connector unit 100 and the power supply unit 200, and the connector unit 100 may include the switching unit 280 having the configuration illustrated in FIGS. 1, 3, and 7. In addition, the power supply unit 200 includes a plug 202 for receiving external power (AC 110/220V), a power unit 200 for converting power provided from the corresponding plug 202 (via the switching unit 280) to DC power suitable for the product 300 and generating its own operation power VCC, a current sensing unit 204 for identifying a supply state of the power provided via the switching unit 280, a controller (including a micom U2 and a memory U1) for receiving a current value from the current sensing unit 204 to grasp the supply state of current power, outputting a control signal for a standby power cut-off when it is determined that a battery of the currently connected product is fully charged and/or a power supply of the product is turned off, and determining that the current product is switched to an on state from an off state to output a control signal for a power supply, and a driver 201 for generating a switching driving signal to the switching unit 280 according to the control signal output from the controller. The micom U2 included in the controller performs operation and determination actions, and the memory U1 performs a function of storing a value of a current flowing when the power supply of the product is turned off and the battery is fully charged (when the power supply of the product with no battery is in the off state) as a reference current value.

At this time, the driver 201 may further include a constant voltage apparatus Q7 for receiving the power through the switching unit driving switcher 301 to generate operation power of the controller and supplying the generated operation power when a power switch of the product 300 with the battery is turned "on" in a state where power of the power supply apparatus is cut off.

Further, the driver may be implemented in a structure connecting a first switching element to a fourth switching element (for example, npn type transistors Q1, Q2, Q3, and Q4)

as a means for driving the switching unit 280 by the control signal of the controller (micom U2).

At this time, the first and second switching elements (transistors) Q1 and Q2 receive an input (for example, collector terminal) of power commonly provided from the constant voltage apparatus Q7 and their own operation power VCC, and an output (for example, emitter terminal) of the second switching element Q2 is connected to a first terminal of the solenoid and an output (emitter terminal) of the first switching element Q1 is connected to a second terminal of the solenoid. Further, an input (collector terminal) of the third switching element Q3 is connected to the first terminal of the solenoid and an output (emitter terminal) is connected to a ground terminal, and an input (collector terminal) of the fourth switching element Q4 is connected to the second terminal of the solenoid and an output (emitter terminal) is connected to the ground terminal.

Describing an operation of the power supply apparatus having the configuration as illustrated in FIG. 2 according to the present invention, when the power supply apparatus is inserted in an outlet and the connector unit 100 of the power supply apparatus is connected to the product 300, the knob 219 of the switching unit 280 moves in the D direction and the operation of the switching unit 280 as described above is executed, which makes the state illustrated in FIG. 5. Then, the fixed contact 285 and the elastic contact 286 of the switching unit 280 are connected to each other and power is applied to the power unit 203. As a result, the power unit 203 generates and supplies power required by the power supply apparatus and power required by the product 300.

When the required power is supplied, the micom U2 reads the current value from the current sensing unit 204 by an analog/digital converter AD1, stores the current value in an internal buffer, continuously checks a current flowing in the product 300 to compare the checked current with the value in the buffer, and changes the current into the value in the buffer when the current is smaller than the value in the buffer. Since the current value has no change when the power supply of the product 300 is turned "off" and the battery power is fully charged, if there is no change in the current although the current is additionally measured for a preset time T, it is considered that the power supply is turned "off" and the battery power is fully charged, and thus the current value in the buffer as the reference current i1 is stored in the E2-PROM memory U2 as a power "off" reference value. Thereafter, a second output O2 of the micom U2 is output as being in a "high" state in order to cut off the standby power. Accordingly, the first and third transistors Q1 and Q3 of the driver 201 are turned "on", and thus a current flows from a point P to a point U via the solenoid 284. Then, the repulsive force with the magnetic 288 is generated, and the cam 294 is pulled in the B direction by the cam spring 292. Therefore, the striker 291 returns to the original position, and the fixed contact 285 and the elastic contact 286 are separated from each other as illustrated in FIG. 6, thereby cutting off the input power and then the standby power.

When a signal is input to a Wake-on-LAN detector 305 from the outside through an Internet or when the power switch (P/SW) of the product 300 is turned "on", since the standby power unit 302 supplies minimally required power to the product even when the power supply is turned "off", the power controller detects the signal or the on state, and transmits a control signal to the switcher 303 through an output O4. Accordingly, the required power is supplied to the product 300 through an operation of the DC/DC converter, and the product (notebook or the like) normally operates.

Further, the power controller transmits the control signal to the switching unit power switcher 301 through an output O3 for the preset time t1, and accordingly the battery power is supplied to the micom U2 through the constant voltage apparatus Q7 of the driver 201 of the power supply apparatus, which starts operating the micom U2. The micom U2 starts an initial operation to transmit a "high" pulse output to the first output O1 and turns "on" the second and fourth transistors Q2 and Q4 of the driver. Accordingly, the current flows from the point U to the point P via the solenoid 284, and pulling force with the magnet 288 is generated, so that the slide 293 pulls the cam 294 in the A direction, which allows the striker 291 to connect the elastic contact 286 and contact 285 as illustrated in FIG. 5. Accordingly, the power is supplied to the power supply apparatus, and the power supply apparatus supplies the required power to the product 300.

Meanwhile, describing an operation of the power supply apparatus when the power supply apparatus is connected to the product having no battery, similarly as a case of the product having the battery, the power supply apparatus is inserted in the connector unit 100, the knob 219 of the switching unit 280 moves in the D direction and the operation of the switching unit 280 as described above is executed, which makes the state illustrated in FIG. 5. Then, the fixed contact 285 and the elastic contact 286 of the switching unit 280 are connected to each other, and thus power is applied to the power unit 203, thereby the power unit 203 generates and supplies power required by the power supply apparatus and power required by the product 300.

When the required power is supplied, the micom U2 reads the current value from the current sensing unit 204 by an analog/digital converter AD1, stores the current value in an internal buffer, continuously checks a current flowing in the product 300 to compare the checked current with the value in the buffer, and changes the current into the value in the buffer when the current is smaller than the value in the buffer. Since the current value has no change when the power supply of the product 300 is turned "off" and the battery power is fully charged, if there is no change in the current although the current is additionally measured for a preset time T, it is considered that the power supply is turned "off", and thus the current value in the buffer as the reference current i1 is stored in the E2-PROM memory U2 as a power "off" reference value. Thereafter, a second output O2 of the micom U2 is output as being in a "high" state in order to cut off the standby power. Accordingly, the first and third transistors Q1 and Q3 of the driver 201 are turned "on", and thus a current flows from a point P to a point U via the solenoid 284. Then, the repulsive force with the magnet 288 is generated, and the cam 294 is pulled in the B direction by the cam spring 292. Therefore, the striker 291 returns to the original position, and the fixed contact 285 and the elastic contact 286 are separated from each other as illustrated in FIG. 6, thereby cutting off the input power and then the standby power.

At this time, in the product having no battery, in order to turn "on" the power supply of the product without separating the connector unit 100, the fixed contact 285 and the elastic contact 286 are connected to each other by pushing the manual control switch 295 of the switching unit 280 in the A direction as illustrated in FIG. 5. Accordingly, the power is supplied to the power supply apparatus, and the power supply apparatus supplies the required power to the product, which allows the product to normally operate when the power supply of the product is turned "on" in the future.

In such an operation, the product having no battery may have a configuration performing only a power cut-off operation without including the memory U2 since it is considered that the power supply is turned "off" when there is no change in the current although the current is additionally measured for a predetermined time T.

Meanwhile, in the above detailed description, the power supply apparatus such as the notebook or the radio are described as an example in an embodiment for easier understanding of the present invention, but it will be apparent to those skilled in the art that the same principle may be applied to other similar products in the present invention.

Accordingly, various modifications and changes may be made to respective components without departing from the sprit and the scope of the present invention. The scope of the present invention is not limited to the above described embodiments, but should be defined by the appended claims.

The invention claimed is:

1. A power supply apparatus with a standby power cut-off structure, the power supply apparatus comprising:
   a power supply unit configured to:
      receive external power supplied through a plug to convert the external power to power suitable for a power supply target apparatus, and
      generate its own operation power of the power supply apparatus, the power supply unit including the plug connected to an outlet to receive the external power;
   a connector unit including:
      a power supply terminal connected to a connection terminal of the power supply target apparatus to supply power to the power supply target apparatus, and
      a switching unit configured to establish or block an electric conduction of a power supply path through which the external power is provided to the power supply unit by a drive of a solenoid according to a switching driving signal provided from the power supply unit and a mechanical movement according to the drive of the solenoid, the switching unit being installed in the corresponding power supply path between the external power and the power supply unit; and
   a cable configured to connect the power supply unit and the connector unit,
   wherein the power supply unit is further configured to:
      identify a supply state of power provided through the switching unit,
      output the switching driving signal to the switching unit when it is determined, through the identified supply state, that a battery of the currently connected power supply target apparatus is fully charged and/or a power supply is turned off, and
      allow the switching unit to cut off the power supply.

2. The power supply apparatus as claimed in claim 1, wherein the switching unit comprises:
   a knob installed in a contact surface between the power supply target apparatus and the switching unit when the connector unit is connected to the power supply target apparatus and configured to be pressed, and a mechanical structure for moving a contact of the switching unit to a conductive position of the power supply path as the knob is pressed; and
   a manual control switch installed that is configured to control an on/off state of power, and
   a mechanical structure configured to move the contact of the switching unit to the conductive position or a cut-off position of the power supply path according to a control of the manual control switch,
   wherein when the knob is initially pressed, the manual control switch is also configured to move to an on-state position through an interworking, and an off-state position movement or an on-state position movement is mechanically constructed not to influence a movement of the knob.

3. The power supply apparatus as claimed in claim 2, wherein the switching unit comprises:
   a knob spring configured to provide elastic force to return the knob to an original position when the knob is pressed;
   a cam lever configured to push a cam so that the cam moves in a preset direction as the knob is pressed;
   a lever spring configured to provide elastic force to return the cam to an original position after the cam lever pushes the cam;
   the cam pushed and moved by the cam lever;
   a slide of a metal material integrally formed with the cam;
   a magnet integrally formed with a core providing tensile force to the slide for maintaining a position of the cam in a position moved by the cam lever;
   a cam spring configured to provide elastic force to return the cam to an initial position when the tensile force by the magnet becomes weak;
   a striker integrally formed with the cam and made of an insulation material; and
   an elastic contact pressed by the strider when the cam is moved by the cam lever and a fixed contact connected when the elastic contact is pressed, the elastic contact and the fixed contact achieving the contact of the switching unit,
   wherein the solenoid is driven by the switching driving signal to open the contact at least in a state where the fixed contact and the elastic contact are connected, and
   the manual control switch is configured to be a cam knob type having a structure integrally formed with the cam.

4. The power supply apparatus as claimed in claim 1,
   wherein the power supply unit is configured to identify whether operation power is provided from the corresponding connected power supply target apparatus through the power supply terminal of the connector unit, and
   when the operation power is provided, the power supply unit is configured to output the switching driving signal to the switching unit and allow the switching unit to restart the power supply.

5. The power supply apparatus as claimed in claim 1,
   wherein the power supply unit is configured to identify whether operation power is provided from the corresponding connected power supply target apparatus through the power supply terminal of the connector unit, and
   when the operation power is provided, the power supply unit is configured to output the switching driving signal to the switching unit and allow the switching unit to restart the power supply.

6. The power supply apparatus as claimed in claim 5, wherein the power supply unit comprises:
   a power unit configured to convert power provided from the plug via the switching unit to power suitable for the power supply target apparatus, and generating its own operation power;
   a current sensing unit configured to identify a supply state of the power provided via the switching unit;
   a controller configured to:
      receive a current value from the current sensing unit to grasp a supply state of current power,
      output a control signal for a standby power cut-off when it is determined that a battery of the power supply target apparatus is fully charged and/or a power supply of the power supply target apparatus is turned off, and determine that the power supply target apparatus is switched to an on-state from an off-state to output a control signal for the power supply; and a driver configured to generate the switching driving signal to the switching unit according to the control signal output from the controller.

7. The power supply apparatus as claimed in claim 6, wherein the power supply target apparatus comprises a switching unit driving switcher configured to provide battery power to the power supply terminal of the connector unit of the power supply target apparatus when the power supply target apparatus is turned on, and the driver further comprises a constant voltage apparatus configured to receive power through the switching unit driving switcher to generate and supply operation power of the controller.

8. The power supply apparatus as claimed in claim 7, wherein the driver includes a connection structure of first to fourth switching elements configured to perform a switching operation by the control signal as a means for driving the switching unit by the control signal of the controller, and first and second switching elements commonly receive an input of power provided from the constant voltage apparatus and their own operation power, wherein an output of the second switching element is connected to a first terminal of the solenoid of the switching unit, an output of the first switching element is connected to a second terminal of the solenoid, an input of the third switching element is connected to the first terminal of the solenoid and an output is connected to a ground terminal, and an input of the fourth switching element is connected to the second terminal of the solenoid and an output is connected to the ground terminal.

9. The power supply apparatus as claimed in claim 6, wherein the driver includes a connection structure of first to fourth switching elements configured to perform a switching operation by the control signal as a means for driving the switching unit by the control signal of the controller, and first and second switching elements commonly receive an input of their own operation power, wherein an output of the second switching element is connected to a first terminal of the solenoid of the switching unit, an output of the first switching element is connected to a second terminal of the solenoid, an input of the third switching element is connected to the first terminal of the solenoid and an output is connected to a ground terminal, and an input of the fourth switching element is connected to the second terminal of the solenoid and an output is connected to the ground terminal.

10. The power supply apparatus as claimed in claim 6, wherein the controller is configured to:

read and identify the current value from the current sensing unit in an initial power supply, and determine that the power supply of the power supply target apparatus is turned off and/or the battery of the power supply target apparatus is fully charged when there is no current change although a current has been measured for a preset time.

11. The power supply apparatus as claimed in claim 7, wherein the controller is configured to:

read and identify the current value from the current sensing unit in an initial power supply, and determine that the power supply of the power supply target apparatus is turned off and/or the battery of the power supply target apparatus is fully charged when there is no current change although a current has been measured for a preset time.

12. The power supply apparatus as claimed in claim 8, wherein the controller is configured to:

read and identify the current value from the current sensing unit in an initial power supply, and determine that the power supply of the power supply target apparatus is turned off and/or the battery of the power supply target apparatus is fully charged when there is no current change although a current has been measured for a preset time.

13. The power supply apparatus as claimed in claim 9, wherein the controller is configured to:

read and identify the current value from the current sensing unit in an initial power supply, and determine that the power supply of the power supply target apparatus is turned off and/or the battery of the power supply target apparatus is fully charged when there is no current change although a current has been measured for a preset time.

14. The power supply apparatus as claimed in claim 2, wherein the power supply unit is configured to identify whether operation power is provided from the corresponding connected power supply target apparatus through the power supply terminal of the connector unit, and when the operation power is provided, the power supply unit is configured to output the switching driving signal to the switching unit and allow the switching unit to restart the power supply.

15. The power supply apparatus as claimed in claim 3, wherein the power supply unit is configured to identify whether operation power is provided from the corresponding connected power supply target apparatus through the power supply terminal of the connector unit, and when the operation power is provided, the power supply unit is configured to output the switching driving signal to the switching unit and allow the switching unit to restart the power supply.

* * * * *